US012809938B2

(12) United States Patent
Paglieroni

(10) Patent No.: US 12,809,938 B2
(45) Date of Patent: Nov. 24, 2026

(54) CLASSIFIER TO CLASSIFY ANOMALOUS OBJECTS EXTRACTED FROM A SENSOR DATA FIELD

(71) Applicant: Lawrence Livermore National Security, LLC, Livermore, CA (US)

(72) Inventor: David W. Paglieroni, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 734 days.

(21) Appl. No.: 17/656,496

(22) Filed: Mar. 25, 2022

(65) Prior Publication Data

US 2023/0306085 A1 Sep. 28, 2023

(51) Int. Cl.

| | |
|---|---|
| ***G06F 18/21*** | (2023.01) |
| ***G06F 16/22*** | (2019.01) |
| ***G06F 18/2413*** | (2023.01) |

(52) U.S. Cl.

CPC ...... *G06F 18/2185* (2023.01); *G06F 16/2237* (2019.01); *G06F 18/24147* (2023.01); *G06F 2218/10* (2023.01); *G06F 2218/12* (2023.01)

(58) Field of Classification Search

None

See application file for complete search history.

(56) References Cited

U.S. PATENT DOCUMENTS

| | | | | |
|---|---|---|---|---|
| 8,224,057 | B2 * | 7/2012 | Hong | G06T 7/0012 382/130 |
| 8,755,580 | B2 * | 6/2014 | Wang | G06V 20/698 382/129 |
| 9,484,038 | B2 * | 11/2016 | Del Galdo | G10L 19/008 |
| 10,109,282 | B2 * | 10/2018 | Del Galdo | H04R 3/005 |
| 11,199,414 | B2 * | 12/2021 | Zhang | G06T 7/73 |

(Continued)

OTHER PUBLICATIONS

Shelhamer, E., et al., "Fully Convolutional Networks for Semantic Segmentation," Member, IEEE, arXiv:1605.06211v1 [cs.CV] May 20, 2016, 12 pages.

(Continued)

*Primary Examiner* — Tahmina N Ansari

(74) *Attorney, Agent, or Firm* — Volpe Koenig

(57) ABSTRACT

A system is provided for background suppression and anomaly detection/classification in a sensor data field using an omnidirectional stochastic technique to expose anomalies. For each element in the sensor data field, the system identifies neighborhoods of elements that cover the various nearby parts of the sensor data field in all directions. At a specified statistical significance level for background, the system considers the element to be background if it is statistically insignificant relative to the elements in any one of the surrounding neighborhoods. The system exposes anomalous objects by applying an attenuation coefficient near zero to those background elements. The system grows anomalous objects from seed elements that correspond to local peaks in the background-suppressed sensor data field. The system can be trained to jointly learn an effective statistical significance level for background suppression and the parameters for classifying objects as of interest or not of interest.

7 Claims, 8 Drawing Sheets

(56) References Cited

U.S. PATENT DOCUMENTS

| | | | | |
|---|---|---|---|---|
| 2004/0041084 | A1* | 3/2004 | Carlson | G01V 8/10<br>250/221 |
| 2009/0103797 | A1* | 4/2009 | Hong | G06T 7/0012<br>382/132 |
| 2013/0268280 | A1* | 10/2013 | Del Galdo | G10L 19/00<br>704/500 |
| 2014/0317595 | A1* | 10/2014 | Kilby | H04W 4/02<br>717/105 |
| 2019/0234746 | A1* | 8/2019 | Zhang | G06T 7/73 |
| 2023/0306085 | A1* | 9/2023 | Paglieroni | G06N 3/09 |

OTHER PUBLICATIONS

Coltuc, D., et al., "A Very Fast Algorithm for Max/Min Filtering," Research Institute for Electrical Engineering, Bucharest, Romania, downloaded on Feb. 5, 2021 at 01:28:39 UTC from IEEE Xplore, 3 pages.

* cited by examiner

CLASSIFIER TO CLASSIFY ANOMALOUS OBJECTS EXTRACTED FROM A SENSOR DATA FIELD

STATEMENT REGARDING FEDERALLY SPONSORED RESEARCH

This invention was made with Government support under Contract No. DE-AC52-07NA27344 awarded by the United States Department of Energy. The Government has certain rights in the invention.

BACKGROUND

In many applications, it is important to detect certain anomalous states so that they can be addressed. Some of these anomalous states may be considered not of interest (e.g., innocuous) while others may be considered of interest (e.g., threatening). As examples, a benign tumor in an organ may be innocuous while a malignant tumor may be threatening. A pattern of high cell phone traffic in a certain area during a musical event may be innocuous while the pattern before an explosion may be threatening. A rock under a roadway may be innocuous while an explosive device buried under the road may be threatening.

Anomalous states can be detected in sensor data relating to these applications. Sensor data may include observations (raw measurements) made by a sensor or image reconstructions from raw data. Each sensor reading of the sensor data may be associated with a position in a multi-dimensional space that may include dimensions for location and/or a dimension for time. As examples, sensor readings collected while traveling on a roadway using a ground penetrating radar (GPR) may be associated with dimensions representing positions along, across, and below the roadway. Sensor readings representing number of active cell phone calls may be associated with locations in a grid at specific times. Voxels in computed tomography (CT) images reconstructed from sensor readings have three spatial coordinates.

In some types of sensor data, anomalous states are suggested by sensor readings that are low or high relative to background sensor readings. As examples, greatly reduced sensor readings relating to cell phone traffic in an area may represent an anomalous state consistent with failure of a cell tower, while greatly increased energy levels in ground penetrating radar return signals may represent an anomalous state consistent with the presence of a buried explosive device.

Once an anomalous state is detected, the sensor readings can be further analyzed to identify the cause of the anomaly. For example, a person can review CT scans to determine whether a tumor is increasing in size. As another example, a classifier may be used to identify the composition of an object in a CT scan of luggage at an airport associated with a detected anomaly.

Machine learning techniques may be used to automatically detect anomalous states in sensor data. Such techniques often use neural networks, such as convolutional neural networks (CNNs), fully convolutional networks (FCNs), generative adversarial networks (GANs), and so on. CNNs and FCNs in particular eliminate the need for carefully engineered features and carefully crafted detection algorithms. However, CNN and FCN models typically require large amounts of training data that include examples of anomalous states (positive examples) and non-anomalous states (negative examples). Also, although the accuracy of a neural network model may increase as the complexity of the model increases (as indicated by the number of synapses in the neural network), the amount of training data that is needed also increases. The process of generating large amounts of training data can be time consuming, and the process of training CNN or FCN models can be slow and computationally expensive. Worse yet, large amounts of real training data are not always available, in which case training data may need to be augmented and synthesized with simulation. In addition, it can be difficult to explain what causes an anomalous state to be detected or not detected by a CNN or an FCN. If the detection results cannot be explained, one may have less confidence in the results. For example, a CNN may not detect the presence of a gun in an x-ray image of luggage because many images of negative training examples happened to include small handheld hair dryers that resemble guns. A person who visually inspects the x-ray image may be puzzled as to why no gun was detected. Alternatively, a CNN may detect the presence of contraband in luggage, but it may be unclear as to how it arrived at its decision.

DETAILED DESCRIPTION

Methods and systems are provided for background suppression, anomalous object detection, and object classification in data collected by a sensor. In some embodiments, a system processes sensor readings of a sensor data field, which is an array of sensor readings (e.g., an image with pixel values). The system suppresses background (or insignificant) sensor readings to expose anomalous objects, detects anomalous objects within the background-suppressed sensor readings, and applies a classifier to the anomalous objects to classify them as of interest or not of interest. Each sensor reading in a sensor data field has an associated position in a space with dimensions, for example, of location and/or time. In video, for example, a position may be represented by an xy location in an image frame and the image frame timestamp. Each sensor reading may have a position that is associated with an integral number of units (e.g., centimeters or seconds) in each dimension of the space, such as a position of (2.0 cm, 5.0 cm, 4.0 cm, and 30 sec) in a 4D space. In the following, the term "sensor reading" (or "sensor data field array element") refers to a value of an observation (e.g., intensity level) combined with the position associated with the location of the observation in the sensor data field. The meaning, however, will be clear from the context. Suppressing a sensor reading means attenuating (reducing) its value, while the distance between sensor readings means the distance between the positions of the sensor readings.

Figure 1:
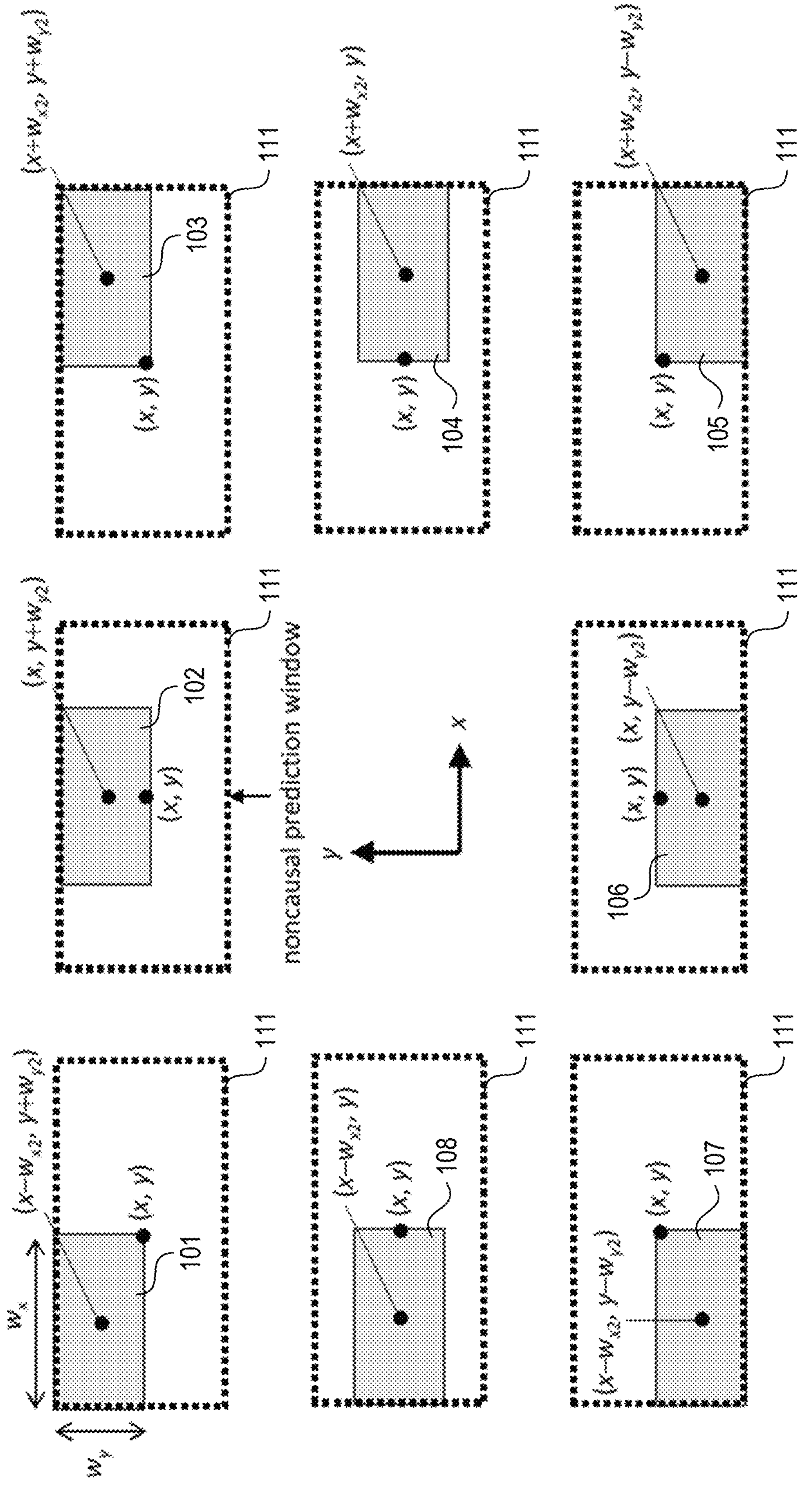
FIG. 1 is a diagram that illustrates neighborhoods of a sensor reading.

In some embodiments, the system identifies background sensor readings by comparing a sensor reading to nearby sensor readings. For each sensor reading, the system identifies neighborhoods of sensor readings that include that sensor reading. Each neighborhood is defined by a neighborhood criterion that may, for example, specify the dimensions of the neighborhood and the position of that sensor reading within the neighborhood. The neighborhoods may have the same or different extents within the position space. FIG. 1 is a diagram that illustrates neighborhoods of a sensor reading. The sensor reading for position (x,y) has eight neighborhoods 101-108 that are each within a vicinity 111 that has the sensor reading for position (x,y) at the center. Neighborhood 101 represents sensor readings in the upper left portion of the vicinity, neighborhood 102 represents sensor readings in the upper center portion of the vicinity, and so on. The dot at the center of each neighborhood represents the position of the center sensor reading for that neighborhood.

To suppress background sensor readings, the system calculates one or more significance parameters for each neighborhood based on the sensor readings within that neighborhood. For example, the significance parameters for a neighborhood may be the mean and standard deviation (or variance) of the sensor readings in that neighborhood. The system also calculates a significance level for each neighborhood based on the significance parameters for that neighborhood and a designated sensor reading in that neighborhood such as the sensor reading at the center of the neighborhood. For example, the neighborhood significance level may be 0.0, if the center sensor reading is a specified number of standard deviations below the mean, indicating that the sensor reading is insignificant. The neighborhood significance level may be 1.0, if the center sensor reading is more than a specified number of standard deviations above the mean, indicating that the sensor reading is significant. The neighborhood significance level may be between 0.0 and 1.0 if the sensor reading is neither insignificant nor significant. In this case, the neighborhood significance level increases (for example, linearly) with the center sensor reading. The number of standard deviations from the mean may be set manually, for example, when the objective is just to suppress background sensor readings. If, however, the objective is to detect objects of interest, the number of standard deviations may be learned using machine learning techniques.

The system sets a vicinity significance level for the sensor reading at the center of a vicinity based on the significance levels of the various neighborhoods in the vicinity (for example, as the minimum of the significance levels for the sensor reading relative to any neighborhood in the vicinity). Conceptually, a sensor reading may be considered insignificant if it is insignificant relative to any neighborhoods in its vicinity, and significant if it is significant relative to all neighborhoods in its vicinity. When the vicinity significance level is based on neighborhoods in all directions, the system may be considered to employ an omnidirectional approach although non-omnidirectional approaches may also be employed.

The system accounts for the significance level of each sensor reading by suppressing (attenuating) the magnitudes of insignificant (background) sensor readings potentially all the way down to zero and leaving significant sensor readings unchanged and exposed. For example, the system may multiply each sensor reading by an attenuation coefficient that varies from zero to one. This may be considered a stochastic approach to exposing an anomaly.

In some embodiments, after suppressing the background sensor readings, the system detects anomalous objects (also referred to as just objects) that satisfy an anomalous object criterion such as containing only sensor readings that are deemed to be anomalous based on their vicinity significance levels. The system identifies local peak sensor readings relative to nearby sensor readings in a region. However, a peak sensor reading may also satisfy a peak criterion such as exceeding a peak threshold. For example, the threshold may be two standard deviations above the mean of nearby background-suppressed sensor readings. If there are multiple highest sensor readings nearby, the system selects one of them as the local peak sensor reading by employing a technique referred to as peak disambiguation.

The system grows an anomalous object from each local peak sensor reading, referred to as the seed, to include anomalous sensor readings that are spatially connected to the seed. Anomalous objects thus contain sensor readings that are adjacent in the sensor data field array. The sensor readings of elements in an anomalous object satisfy an anomalous object criterion, such as not exceeding the seed reading, not being zero, and not being less than the seed minus some specified amount.

The system generates an object feature vector based on features derived from each anomalous object and classifies the anomalous object as “of interest” or “not of interest” by applying an object classifier (or just classifier) to the object feature vector. The object classifier (e.g., a trained machine learning model) may output a classification value that is a real number that quantifies the degree of the interest in the object. If the object classifier output exceeds an “of-interest” threshold, the object is said to be “of interest.” Otherwise, the object is said to be “not of interest.”

From training data, the system learns the degree of background suppression in the sensor data field (e.g., some number of standard deviations from the mean value of sensor readings) jointly with the object classifier parameters so as to optimize detection and classification performance. The training data contains sensor data fields and locations of known objects of interest within those fields (e.g., GPR images tagged with locations of buried explosives). The system trains an object classifier on sensor data fields with different background suppression levels, such as a different number of standard deviations relative to a mean. For a given background suppression level, the system identifies objects and labels them as “of interest” or “not of interest” based on locations of known objects of interest. The system then extracts features for each object, such as the maximum height, width, and depth of the object, the mean of observed sensor values for sensor readings associated with the object, object volume, object symmetry, and so on. The system then trains an object classifier on the set of feature vectors for objects labeled as “of interest” or “not of interest.” During the training, the system also computes a threshold on the object classifier output for objects that are of interest, with the goal of obtaining the smallest possible number of classification errors on the training data.

After the classifiers are trained, the system selects the background suppression level, the corresponding classifier, and the corresponding threshold on the classifier output for objects that are of interest, that classifies objects the most correctly. Classifier effectiveness may be reflected by the number of object classification errors on the training set. The system then employs the learned background significance level, the associated object classifier, and the corresponding threshold on the classifier output for objects that are of interest, to later classify objects identified in sensor data fields.

The system may be employed to process readings from various types of sensors. For example, the sensors could produce data fields representing thermally sensitive infrared images, ground penetrating radar images, sound data from a seismic-acoustic detection array, and so on. In such a case, the system may process readings from multiple types of sensors simultaneously. For example, the sensor readings may be collected by an ultrasonic device targeting the lungs of the patient, sensor readings collected by a scanning device (e.g., CT scanner), and sensor readings collected by a thermal device (e.g., a temperature vest). The system may employ an additional dimension for each sensor type (e.g., dimensions for location, a dimension for time plus a dimension for sensor type). In such a case, if there are 2 dimensions for location, the system would be processing data in 4D. The system may generate a combined attenuation coefficient at location (x,y) based on the combination of attenuation coefficients generated separately for each sensor type at location (x,y). The combined attenuation coefficient might be the minimum of the separate attenuation coefficients. The system may identify local peak sensor readings within subsets of sensor data fields with background suppression as seeds for growing anomalous objects.

In the following, a more formal description of the system is provided. The system employs stochastic prediction to suppress the background in a sensor data field of sensor readings. In the following, sensor readings are also referred to as elements of a sensor data field. The system exposes anomalies by suppressing (attenuating) the background. Attenuation coefficients close to unity are applied to anomalous (statistically significant) elements. The system applies attenuation coefficients close to zero to background (statistically insignificant) elements. The attenuation coefficient can vary from element to element. Assuming that $\underline{x}$ is an n×1 vector of indices into a field u of sensor data (u is an n-dimensional array), the elements of the background suppressed sensor data field are given by the following equation:

$$v(\underline{x}) = \alpha(\underline{x})u(\underline{x}) \tag{1}$$

where $0 \le \alpha(\underline{x}) \le 1$ is the attenuation coefficient for exposing anomalies. Each element $u(\underline{x})$ has its own attenuation coefficient $\alpha(\underline{x})$. The value of $\alpha(\underline{x})$ depends on the statistical significance of $u(\underline{x})$ relative to its peers. The peers of $u(\underline{x})$ can be defined in a variety of ways. For example, if u is a 3D array ($\underline{x}$=(x,y,z)), the peers of $u(\underline{x})$ could be located to the left of (x,y) in the xy plane at z, or within some 3D neighborhood of elements centered on (x,y,z). The system is described primarily in the context of the peers on all sides of an element.

The system may determine the statistical significance of an element based on peer elements within a localized vicinity centered at that element. The system is considered to be omnidirectional if it considers all elements in a vicinity with no bias in any direction from the center field element. For a 2D space, the vicinity hasa width $2w_x$ in x and $2w_y$ in y, where $w_x=2w_{x2}+1$ and $w_y=2w_{y2}+1$. In 2D, Equation 1 is written as $v(x,y)=\alpha(x,y)u(x,y)$. The attenuation coefficient $\alpha(x,y)$ is derived from the element u(x,y) relative to the mean $\mu$ and the standard deviation $\sigma$ of elements in the vicinity of (x,y). Referring to FIG. 1, the set $$\Omega(x, y) = \{(x \pm w_{x2}, y + kw_{y2})_{k=-1,0,1}\} \cup \{(x, y \pm w_{y2})\} \tag{2}$$

of elements at the center of a vicinity of size $w_x \times w_y$ on all sides of (x,y) that contain (x,y) on their border is defined. If (x,y) lies on (or near) the border of the field u in 2D, some of these elements will lie outside of u. The system may zero pad the field u by $\pm w_x$ in x and $\pm w^y$ in y to ensure that for every element (x,y) in u, the vicinity of size $w_x \times w_y$ centered on each of the 8 elements in $\Omega(x,y)$ will always lie completely within the zero-padded field.

Figure 2:
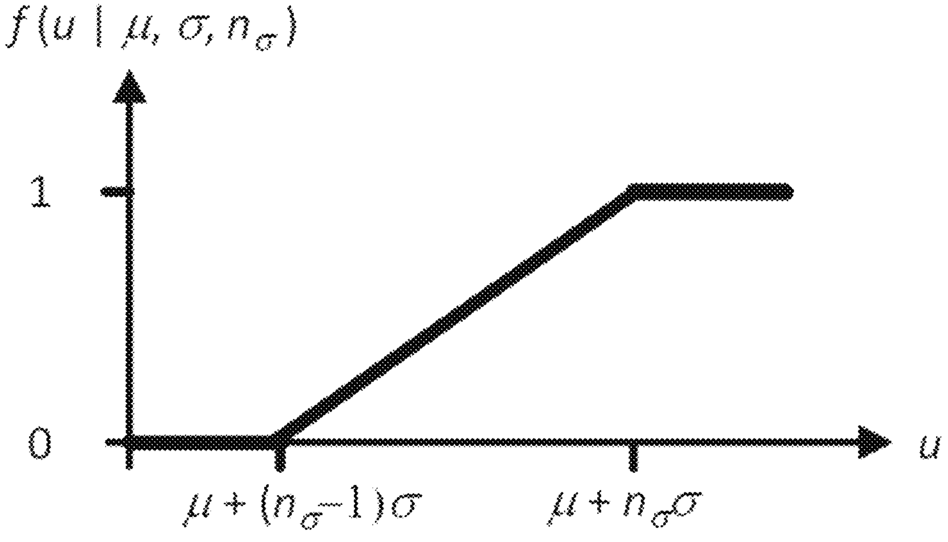
FIG. 2 illustrates an attenuation ramp function.

The statistical significance level for u(x,y) is reflected in the value of $\alpha(x,y)$, i.e., $\alpha(x,y)=1$ if u(x,y) is statistically significant and $\alpha(x,y)=0$ if u(x,y) is statistically insignificant. The attenuation coefficients $\alpha(x,y)$ are derived using an attenuation ramp function $f(u|\mu,\sigma,n_\sigma)$. FIG. 2 illustrates an attenuation ramp function. The mean $\mu$ and standard deviation $\sigma$ represent expected values of the elements of field u, and $n_\sigma$ is a significance threshold. An element u is considered to be statistically significant if $u \ge \mu + n_\sigma\sigma$. Equation 3 expresses an attenuation ramp function mathematically:

$$f(u|\mu, \sigma, n_\sigma) = \begin{cases} 0 & u \le \mu + (n_\sigma - 1)\sigma \\ 1 & u > \mu + n_\sigma\sigma \\ \dfrac{u - [\mu + (n_\sigma - 1)\sigma]}{\sigma} & \text{otherwise} \end{cases} \tag{3}$$

The attenuation coefficient for an element u(x,y) is represented by the following equation:

$$\alpha(x, y) = \min_{(x', y') \in \Omega(x,y)} f(u(x, y) \mid \mu(x', y'), \sigma(x', y'), n_\sigma) \tag{4}$$

The mean and variance values in Equation 4 are given by the following equation:

$$\mu(x, y) = \operatorname*{mean}_{(x', y') \in R(x,y)} u(x', y'), \qquad \sigma^2(x, y) = \operatorname*{var}_{(x', y') \in R(x,y)} u(x', y') \tag{5}$$

where R(x,y) is the window (vicinity) in u of size $w_x \times w_y$ centered on (x,y). The system may compute the mean and standard deviation (or variance) by applying a fast-moving average algorithm in 2D to field u.

In Equation 4, the attenuation coefficient $\alpha(x,y)$ will only be close to unity if the value of the attenuation ramp function $f$ is close to unity in all of the 8 directions emanating from (x,y). The attenuation coefficient $\alpha(x,y)$ will be close to zero if the value of the attenuation ramp function $f$ is close to zero in any of those 8 directions. The attenuation coefficient u(x,y) may thus be considered statistically significant only if it is statistically significant relative to elements of field u in all directions. The attenuation coefficient u(x,y) may be considered statistically insignificant if it is statistically insignificant relative to nearby elements of field u in any direction. The system thus tends to identify isolated concentrations (islands or objects) of energy (indicated by sensor readings) in field u as anomalies. The extents of energy concentrations deemed anomalous are roughly limited by the extents $w_x$ and $w_y$ of the element neighborhoods in field u. By applying a zero padding to field u, the directions pointing to neighborhoods that lie mostly outside of the original version of field u are mostly ignored when attenuation coefficient $\alpha(x,y)$ is computed using Equation 4 (i.e., they will not contribute much to the minimum calculation in Equation 4).

As illustrated in FIG. 1, the system performs stochastic noncausal prediction to the elements of a sensor data field. The predicted value of element u(x,y) is based on the values of elements to either side of both x and y. The system may employ noncausal prediction to a sensor data field that is acquired in advance and then processed forensically (i.e., after the data has been fully acquired). The optimal dimensions for a noncausal prediction window depend on the application. For example, if the goal is to detect small objects in a 2D image, a small noncausal prediction window would be needed. If the goal is to detect larger objects, a larger noncausal prediction window would be needed.

The system can also be formulated to use a causal or semi-causal stochastic predictor. For example, for 2D images that stream in the x direction (along the horizonal axis), one option would be to consider a semi-causal predictor in which the predicted value of the element (x,y) is based solely on the values of elements at any y but at or prior to x. However, by ignoring elements ahead of x, this predictor may tend to view elements near the leading edge (along the x axis) of bright spots as more anomalous than elements near the tailing edge. To prevent this behavioral inconsistency, the system may apply noncausal prediction, which requires the streaming image to be divided into overlapping chunks along the x axis. Within a chunk, attenuation is based only on those elements whose locations are within a certain distance in x from the center. The distance in x from the tailing edge of the "active" rectangular region (that contains the elements to process) to the tailing edge of the rectangular chunk that contains the active region represents a latency (or buffering delay in 2D array data acquisition prior to the transfer of 2D array data for processing). To ensure that all elements of the 2D array are ultimately processed, the leading edges of successive rectangular chunks are offset in x such that their active regions are adjacent and non-overlapping. This latency enables the system to apply noncausal prediction to all elements in the active region. As a result, the predicted value of an element at (x,y) can be based on field elements ahead of x by as much as the latency in x.

Figure 3:
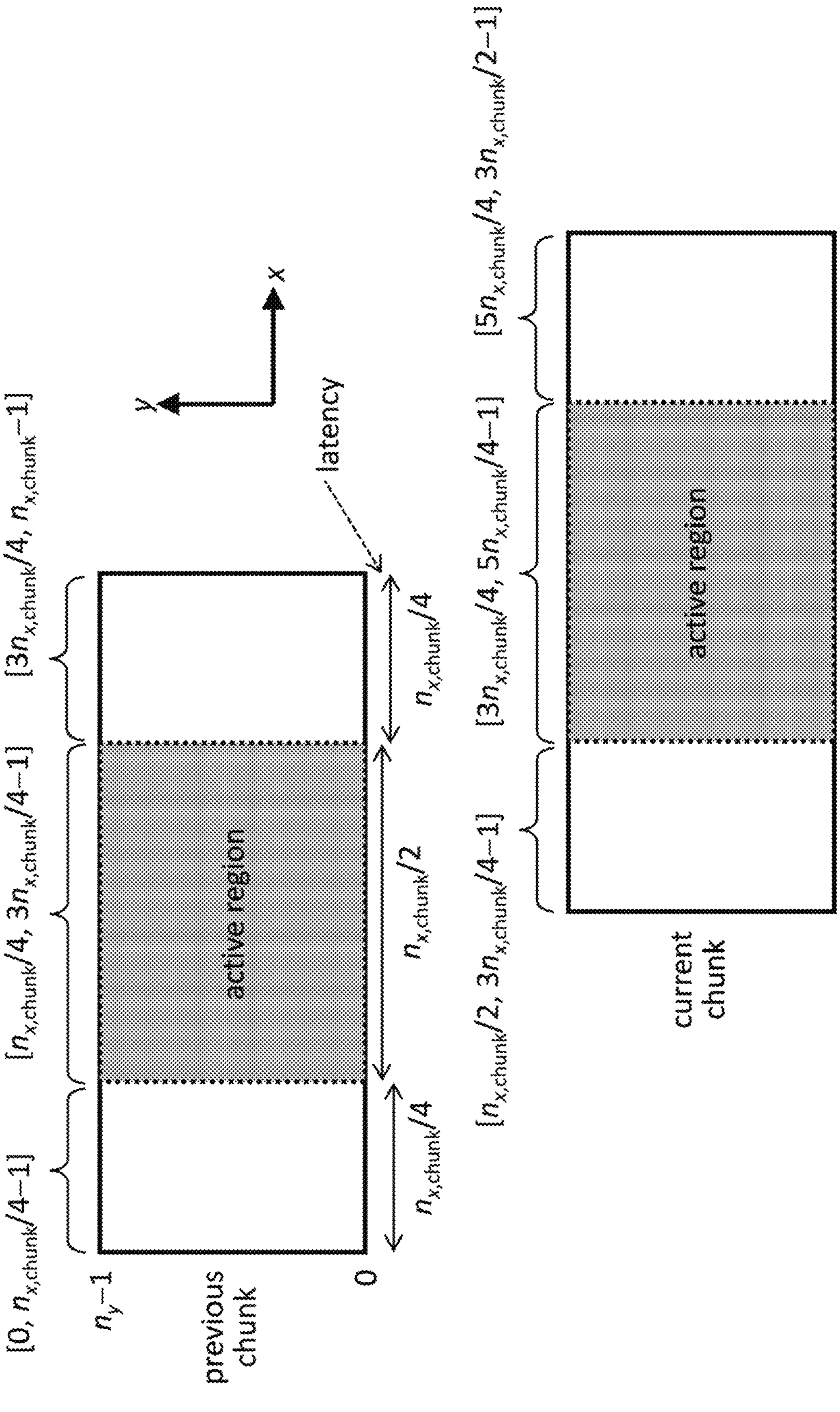
FIG. 3 illustrates the windows for noncausal prediction for a 2D image.

FIG. 3 illustrates the windows for noncausal prediction for a 2D image. A chunk spans the extent of the image along the y axis and has fixed extent $n_{x,chunk}$ along the x axis. Successive chunks overlap each other by a fixed amount (e.g., 50%) along the x axis. The overlap is twice the latency (a look-ahead distance or data buffering delay). For a 50% overlap, the latency is $n_{x,chunk}/4$. The "active" region of the chunk (which contains the data to estimate the background for) lies at the center of the chunk and has extent $n_{x,chunk}/2$ along the x axis. Successive active regions are adjacent and non-overlapping. For every pixel within an active region, its background estimate can be based on the values of pixels within a window of extent $w_x \leq 2\ (n_{x,chunk}/4)+1$ centered on that pixel.

To process a 1D field, the system may employ a modified version of processing for a 2D field. The system may zero-pad the 1 D field by $\pm w_x$ at both the beginning and the end. In Equations 2, 4, and 5, the (x,y) arguments may be replaced by the single argument (x). Even as the values of the field elements rise and fall, the system will still detect anomalies in the sensor data if the prediction window of width $2w_x$ is sufficiently localized.

One way to extend the processing of a 2D field to a 3D field is to replace the pair of arguments (x,y) in Equations 2, 4, and 5 with three arguments (x,y, z). The system may zero pad the 3D field u by $\pm w_x$ in x, $\pm w_y$, in y, and $\pm w_z$ in z. In FIG. 1, the noncausal prediction window will be $2w_x \times 2w_y \times 2_z$, and in Equation 2, there will be 26 (as opposed to 8) neighborhoods in directions emanating from (x,y,z).

In certain applications, it may be more appropriate to extend the system to process 3D fields in a different way. For example, the system may process in 2D separately to each xy, xz, or yz slice and then combine the results along z, y, or x, respectively.

Video is a sensor data field in 3D for which two dimensions (e.g., x and y) are spatial and the third dimension (say z) is temporal. In this case, the system may process each 2D image frame separately. An anomaly (containing significant adjacent sensor readings) that spans successive frames can then be analyzed to identify the extent of the object in time.

As described above, the system may train a classifier on sensor data fields with different background suppression levels and then use a classifier deemed to be effective at distinguishing anomaly objects of interest from anomaly objects not of interest (e.g., the most effective classifier). Based on prior knowledge of locations for objects of interest (e.g., threats) within the sensor data fields used for training, training data can be automatically generated (without human intervention) to produce sets of feature vectors labeled as associated with "objects of interest" (positive examples) or "objects not of interest" (negative examples). A classifier can then be trained on this labeled training set of feature vectors to distinguish objects of interest from objects not of interest. The type of classifier (e.g., a shallow neural network) should be one in which (1) relatively small training sets of object feature vectors $\underline{f}_{objeet}$ are adequate for classifier training (i.e., the number of classifier parameters to learn should be small relative to the number of feature vectors in the training set to avoid over-training) and (2) the classifier output (the classification statistic) $c(\underline{f}_{object})$ has a continuous (as opposed to discrete) range of values.

In some embodiments, the objective function for training on the labeled set of object feature vectors for object classification may be represented by the following equation:

$$\phi(t)=n_{TP}(t)-n_{FP}(t) \tag{8}$$

where t is the decision threshold in a decision rule represented by the following equation:

$$c(\underline{f}_{object}) \underset{\text{object of interest}}{\overset{\text{benign object}}{\substack{<\\ \geq}}} t \tag{9}$$

and where $n_{TP}$ (t) and $n_{FP}$(t) are the number of true and false positive classification results at decision threshold t. The objective function of Equation 8 is related to the number of classification errors $n_E$ made on the training set as represented by the following equation:

$$n_E(t) = n_{FP}(t) + n_{FN}(t) = n_{FP}(t) + [n_p - n_{TP}(t)] = n_P - \phi(t) \tag{10}$$

where $n_{FN}$ is the number of false negatives, $n_P$ is the number of positive exemplars in the training set, and $n_E$ is the sum of the number of type I errors (false positives) and type II errors (false negatives). Maximizing the objective function $\phi(t)$ is tantamount to minimizing the number of classification errors on the training set.

Figure 4:
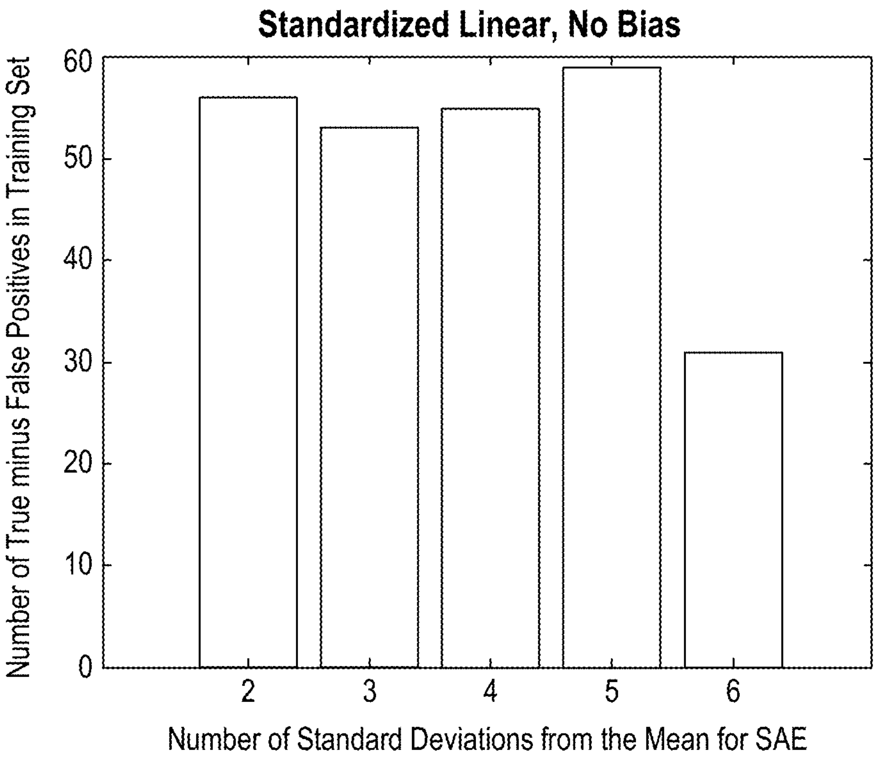
FIG. 4 illustrates the selection of a classifier.

The system may learn the significance level and object classifier parameters together that lead to the best detection performance on the training data using the following algorithm:

Algorithm 1: Learning Background Suppression Level and Object Classifier Parameters Together for each candidate statistical significance level $n_\sigma$ for background suppression
  for each sensor data field in the training set
   • apply omnidirectional anomaly exposure
   • find peaks in resulting background suppressed sensor data field
   • grow objects in resulting sensor data field from the peaks
   • compute object features
  – train object classifier on all objects to obtain the classifier parameter vector $\omega$
  – determine optimal decision threshold t on the classification statistic:

$$t = \arg\max_{t'} \phi(t')$$

if this is the first statistical significance level or $\phi(t) > \phi^*$
  – $\phi^* = \phi(t)$, $t^* = t$, $n_\sigma^* = n_\sigma$, $\omega^* = \omega$ FIG. 4 illustrates results from a training session that jointly learns the degree of background suppression (or background suppression level) and the object classifier parameters. The horizontal axis represents the number of standard deviations (i.e., $n_\sigma=2 \ldots 6$) reflecting the suppression level. The vertical axis represents the difference between the number of true positives and false positives produced by the classifiers. Since the classifier trained using $n_\sigma=5$ has the largest vertical axis value, the system selects that classifier and a background suppression level of $n_\sigma=5$ as the most effective.

Figure 5:
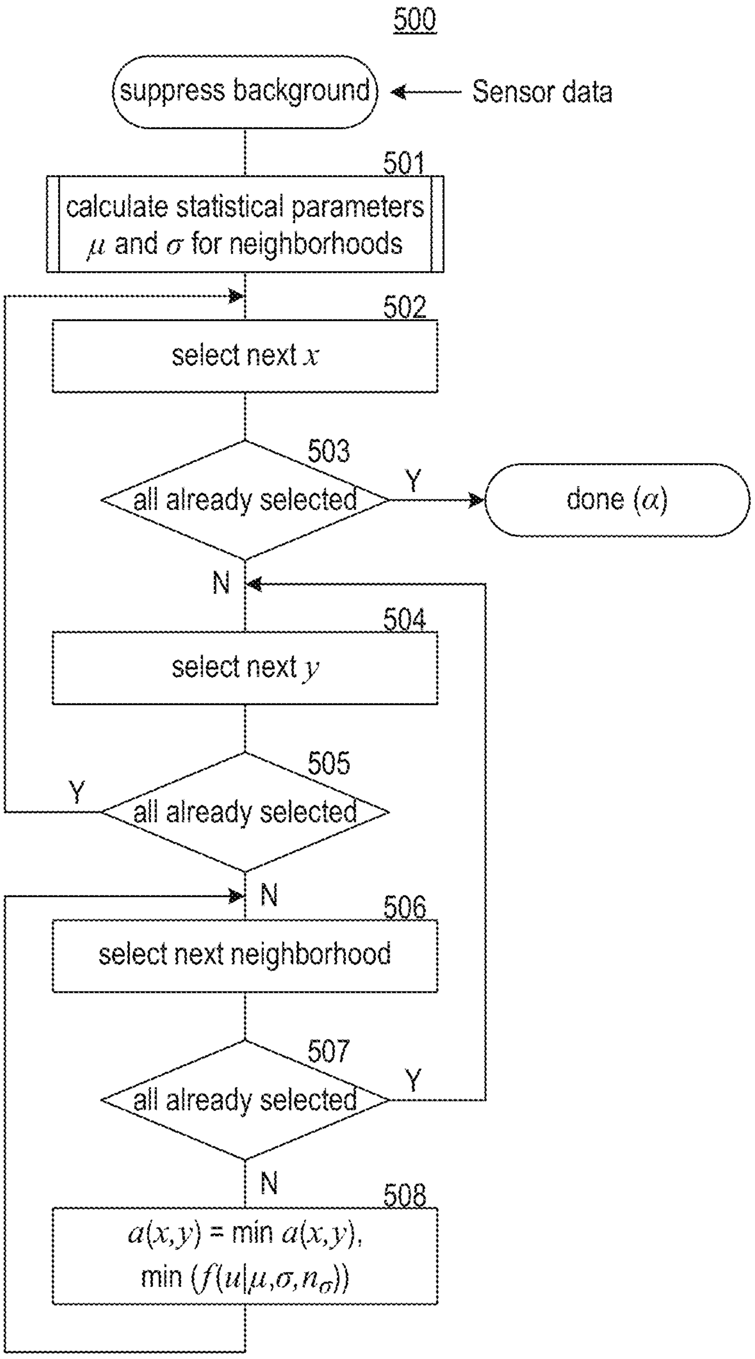
FIG. 5 is a flow diagram that illustrates the processing of a suppress background component of the system in some embodiments.

FIG. 5 is a flow diagram of the "suppress background" component of the system in some embodiments. The suppress background component 500 is passed a 2D sensor data field and performs background suppression on the sensor readings. The component initially employs a fast moving average algorithm when calculating significance parameters of mean and standard deviation based on the size of a neighborhood. The algorithm initializes the moving average values to zero. The algorithm calculates means and standard deviations of sensor readings within moving windows of specified size centered on each (x,y) using the well-known fast moving average algorithm based on accumulator arrays (whose complexity does not increase as the window size grows). In block 501, the component calculates the significance parameters for the neighborhood of each sensor reading using this fast moving average technique. In block 502, the component selects the next value of dimension x. In decision block 503, if all the values of dimension x have already been selected, then the component completes indicating the attenuation coefficient for each sensor reading, else the component continues at block 504. In block 504, the component selects the next value of dimension y. In decision block 505, if all the values of dimension y have already been selected, then the component loops to block 502 to select the next value of dimension x, else the component continues at block 506. In block 506, the component selects the next neighborhood of the sensor reading (x,y). In decision block 507, if all the neighborhoods have already been selected, then the component loops to block 504 to select the next value of dimension y, else the component continues at block 508. In block 508, the component sets the attenuation coefficient for the sensor reading (x,y) to the minimum of the current attenuation coefficient for sensor reading (x,y) and the minimum of the values of an attenuation ramp function applied to each of the sensor readings within the neighborhood. The component then loops to block 506 to select the next neighborhood.

Figure 6:
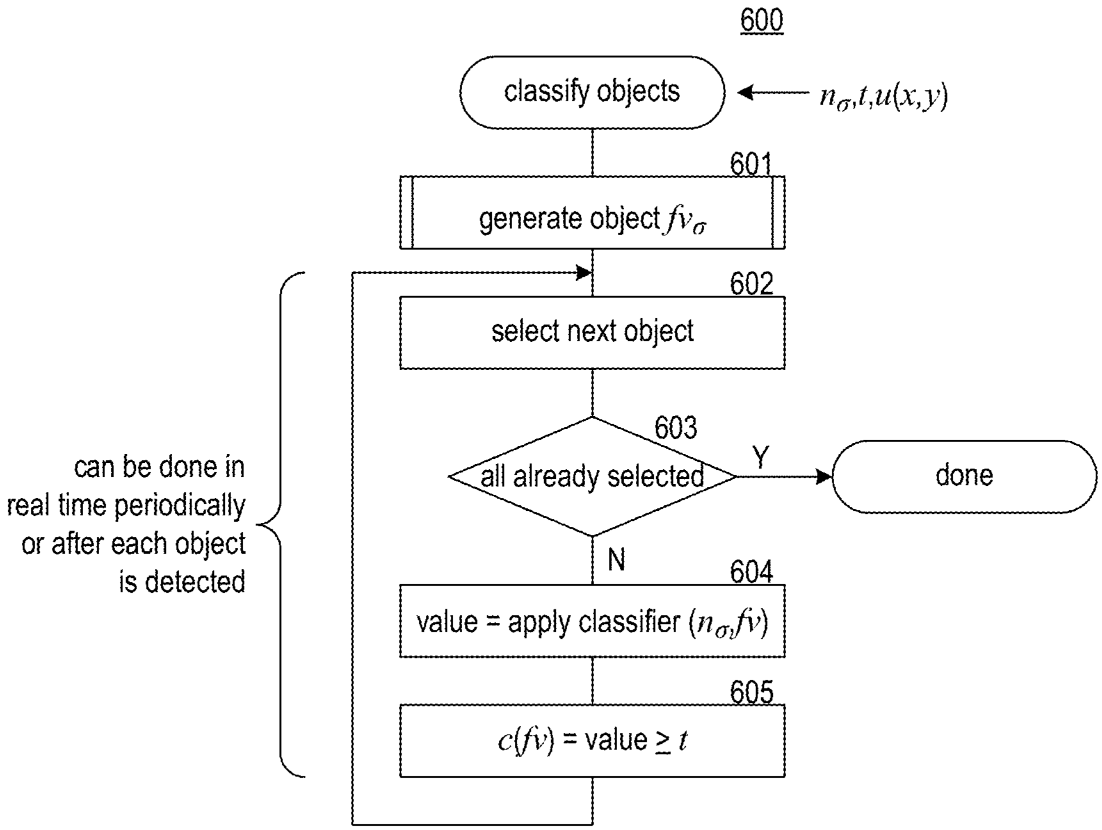
FIG. 6 is a flow diagram that illustrates the processing of a classify objects component of the system in some embodiments.

FIG. 6 is a flow diagram that illustrates the processing of a "classify objects" component of the system in some embodiments. The inputs to the classify objects component 600 are sensor readings of a sensor data field, a significance level for background suppression, and an of-interest threshold for object classification. The output is a set of objects classified as of interest. In block 601, the component invokes a "generate object feature vectors" component to grow objects in the sensor data field and generate their feature vectors (fv). In block 602, the component selects the next object. In decision block 603, if all the objects have already been selected, then the component completes, else the component continues at block 604. In block 604, the component applies the classifier associated with the input significance level $n_\sigma$ to the object feature vector fv. In block 605, if the classification value is greater than the of-interest threshold, the component classifies the object as of interest and then loops to block 602 to select the next object.

Figure 7:
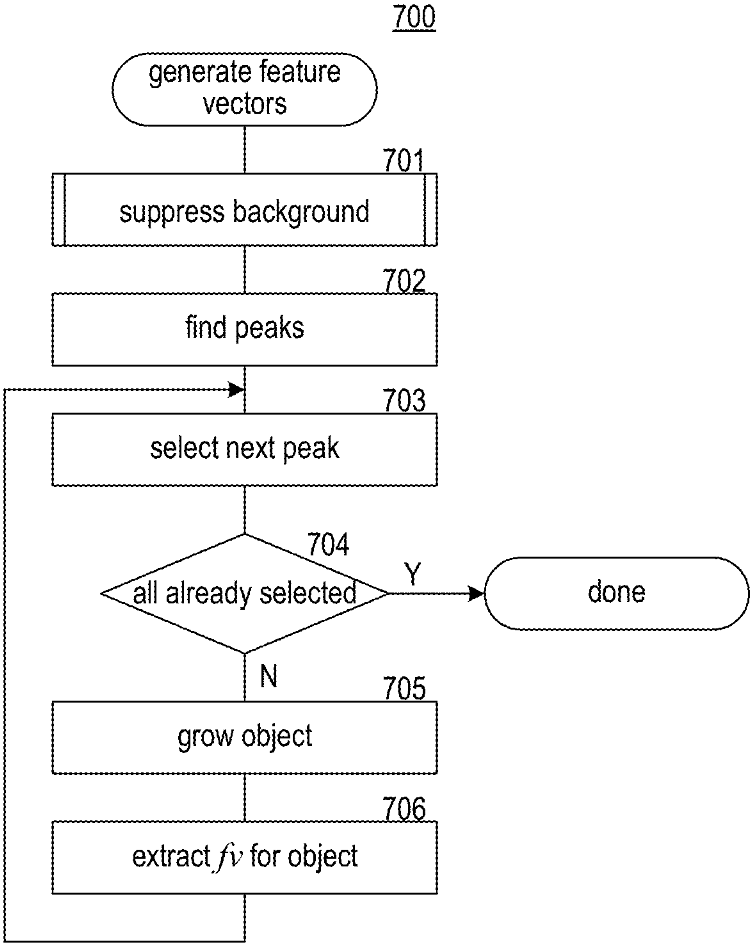
FIG. 7 is a flow diagram that illustrates the processing of a generate feature vectors component of the system in some embodiments.

FIG. 7 is a flow diagram that illustrates the processing of a "generate feature vectors" component of the system in some embodiments. The generate feature vectors component 700 is invoked to identify objects based on a significance level and extract their feature vectors. In block 701, the component invokes the suppress background component to suppress the background sensor readings. In block 702, the component finds the peaks within the background suppressed sensor data field. In block 703, the component selects the next peak. In decision block 704, if all the peaks have already been selected, then the component completes, else the component continues at block 705. In block 705, the component grows the object from the selected peak. In block 706, the component extracts the feature vectors for the object and then loops to block 703 and selects the next peak.

Figure 8:
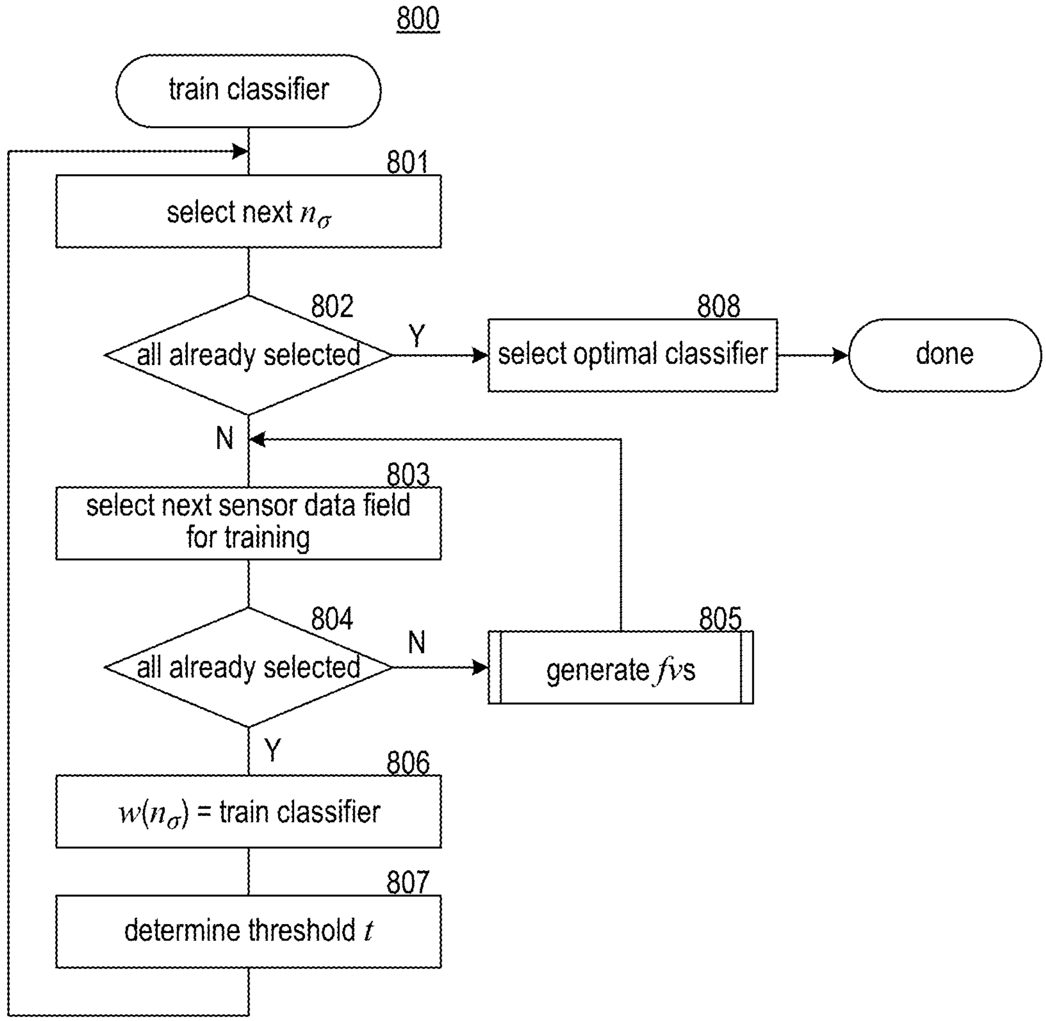
FIG. 8 is a flow diagram that illustrates the processing of a train classifier component of the system in some embodiments.

FIG. 8 is a flow diagram that illustrates the processing of a "train classifier" component of the system in some embodiments. The train classifier component 800 is invoked to jointly learn the suppression level in the sensor data field and the object classifier parameters that effectively classify objects as being of interest or not of interest. In block 801, the component selects the next significance level (of sensor readings) for background suppression in the sensor data field. In decision block 802, if all the significance levels have been selected, then the component continues at block 808, else the component continues at block 803. In block 803, the component selects the next sensor data field in the training data. In decision block 804, if all the sensor data fields have already been selected, then the component continues at block 806, else the component continues at block 805. In block 805, the component invokes the generate feature vectors component to identify the feature vectors of objects within the sensor data field and then labels the objects and loops to block 802 to select the next sensor data field. In block 806, the component trains a classifier using the labeled set of feature vectors to produce classifier parameters $\omega(n_\sigma)$. In block 807, the component determines the optimal of-interest threshold for the classifier and then loops to block 801 to select the next suppression level. In block 808, the component selects the classifier that performs best on the training data and then completes.

The computing systems on which the system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys. The computing systems may be servers that are housed in a data center such as a cloud-based data center.

The system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit (ASIC) or field programmable gate array ("FPGA").

In some embodiments, the object feature vector classifier may be a shallow neural network, Bayesian classifiers, and so on. In addition, a desirable property of the chosen object feature vector classifier is that the training results are easy to explain and interpret (for example, the weights on specific object features in a linear discriminant tend to have higher magnitudes on object features that are important, especially if the features in the vector are somehow normalized in advance). Another desirable property is that the training algorithm should be guaranteed not only to converge, but to converge to a globally optimal solution (for example, neural networks are trained using backpropagation algorithms that do not have this property, but the training algorithm for Fisher's linear discriminant does).

In some embodiments, the system identifies peaks in sensor readings by applying a peak filtering algorithm to the sensor data field with background suppression as described below. The peak filtering algorithm is computationally more efficient than conventional techniques for identifying peaks. The peaks serve as seeds for growing objects within the space spanned by the sensor data field (or a subspace of that space such as growing an object in an xy subspace if the sensor data field spans an xyt space). The system employs a peak filtering algorithm to the space spanned by the sensor data field or to a subspace of the space spanned by the sensor data field. For example, a peak filtering algorithm in 1D might be applied to a 1D sensor data field, a 2D sensor data field, a 3D sensor data field, and so on. The peak filtering algorithms each employ a "min filter" that is specific to certain (possibly all) dimensions of the sensor data field. The peak filtering algorithm described below has linear time complexity in the number of sensor data field elements, and as such, is more efficient and feasible than brute force peak filtering algorithms. It also returns one peak location within a given search window by employing a peak disambiguation technique to select one of multiple peaks in a search window. To identify local maxima in sensor readings rather local minima, the system may negate the sensor readings (multiply them by −1) and apply a min filter to the result. At a peak location, the value of the local maximum and the value of the sensor data field element are the same.

The 1D min filter processes the sequence of sensor readings $$\{u(x)\}_{x=0}^{n_x-1}$$

to produce a sequence of local minimum observation values within sliding windows (intervals) of fixed extent along x:

$$u_{min}(x) = \min_{x_{min}(x) \le x' \le x_{max}(x)} u(x') \tag{A.1}$$

$$\text{for } x = 0 \ \ldots \ n_x - 1$$

$$x_{min}(x) = \max(x - w, 0), \tag{A.2}$$

$$x_{max}(x) = \min(x + w, n_x - 1)$$

where w is the half-width of the min filter window.

The min filter computes values at the beginning and end of the sensor observation sequence as follows:

$$w = 0 \Rightarrow u_{min}(x) = u(x).$$

$$\text{For } w > 0 \text{ when } x \le w,$$

$$u_{min}(0) = \min_{0 \le x \le x_{max}(0)} u(x)$$

$$\text{for } x = 1 \ \ldots \ x_{max}(0)$$

$$x' = \min(x + w, n_x - 1),\ u_{min}(x) = \min[u_{min}(x-1), u(x')]$$

$$\text{if } x_{max}(0) = n_x - 1$$

$$\text{return}$$

$$\text{For } n_x - 1 - w \le x < n_x,$$

$$u_{min}(n_x - 1) = \min_{n_x - 1 - w \le x < n_x u(x)}$$

$$\text{for } x = n_x - 2 \ \ldots \ \max[n_x - 1 - w, x_{max}(0) + 1]$$

$$x' = \max(x - w, 0),\ u_{min}(x) = \min[u_{min}(x+1), u(x')]$$

$$\text{if } 2w + 1 \ge n_x$$

-continued return

For $w < x < n_x - 1 - w$, $$u_{min}(x) = \begin{cases} u(x+w) & u(x+w) \le u_{min}(x-1) \\ u_{min}(x-1) & u(x+w) \text{ and } u(x-1-w) > u_{min}(x-1) \\ \min_{x-w \le x' \le x+w} u(x') & \text{otherwise} \end{cases} \quad (A.3)$$

When either the first or second condition is met in Equation A.3, $u_{min}(x)$ is computed with O(1) complexity. Otherwise, $u_{min}(x)$ is computed with O(2w+1) complexity. However, the first two conditions can be simultaneously violated at most min(n,2w+1−n) out of 2w+1 times, where n>0 is the number of occurrences of the minimum within a window averaged over all windows of length 2w+1 in the u(x) sequence. If n is close to 1 or to 2w+1, the 1D min filter in Equation A.3 will have linear time complexity in the number of sequence samples $n_x$. Equation A.3 may be implemented as follows:

```
buf ← {u(x)}_{x=0}^{2w}, u_min1 = u_min(w), x0 = 0, x1 = 2w
for x = w+1 . . . n_x−2−w
  1. update buf
     u_removed = buf(x0), x0++, x1++
     if x0 > 2w then x0 = 0
     if x1 > 2w then x1 = 0
     u_added = buf(x1) = u(x+w)
  2. compute u_min(x)
     if u_added ≤ u_min1
        u_min(x) = u_min1 = u_added
     else
        if u_removed and u_added > u_min1
           u_min(x) = u_min1
        else
           u_min(x) = min(buf)
```

For multi-dimensional data, the 1D min filter is applied on a dimension-by-dimension basis. For example, for 2D data, the system employs a 2D min filter that may apply the 1D min filter to each row to set a row min filter value for each element. The system then applies the 1D min filter to each column of the row min filter values to set the final min filter value for each element. For 3D data, the system employs a 3D min filter that applies the 2D min filter to each xy planar slice (a 1 D min filter to each row and column of the planar slice). The system then applies a 1 D min filter in the z direction at each (x,y) to the result.

For sensor readings in 2D sensor data fields, the 2D min filter applies the 1D min filter to each row of u(x,y) to produce $u_1(x,y)$. The 2D min filter then applies the 1D min filter to each column of $u_1(x,y)$ to produce $u_{min}(x,y)$. The 2D min filter is defined as follows:

$$u_{min}(x, y) = \min_{\substack{x_{min}(x) \le x' \le x_{max}(x) \\ y_{min}(y) \le y' \le y_{max}(y)}} u(x', y') \quad \text{for } x = 0 \ldots n_x - 1,\ y = 0 \ldots n_y - 1 \quad (A.4)$$

$$x_{min}(x) = \max(x - w_x, 0), \quad x_{max}(x) = \min(x + w_x, n_x - 1) \quad (A.5)$$

$$y_{min}(y) = \max(y - w_y, 0), \quad y_{max}(y) = \min(y + w_y, n_y - 1)$$

The $u_{min}$ (X,Y) is computed as follows:

$$\text{for } x = 0 \ldots n_x - 1$$
$$\{u_1(x, y)\}_{y=0}^{n_y-1} = fastMinFilter1D\left(\{u(x, y)\}_{y=0}^{n_y-1}, w_y\right)$$
$$\text{for } y = 0 \ldots n_y - 1$$
$$\{u_{min}(x, y)\}_{x=0}^{n_x-1} = fastMinFilter1D\left(\{u_1(x, y)\}_{x=0}^{n_x-1}, w_x\right)$$

where fastMinFilter1D is the 1D m) filter.

For 3D sensor readings, the 3D m filter is obtained by applying a 2D min filter separately to the 2D arrayu(x, y|z) for each z to produce $U_{min}$(x,y|z). The 3D min filtering algorithm then obtains $u_{min}$(X,Y,z) by applying the 1D min filter to the 1D sequence $$\{u_{min}(x, y|z)\}_{z=0}^{n_z-1}$$

for each (x,y). The 3D min filter is defined as:

$$u_{min}(x, y, z) = \min_{(x', y', z') \in R(x,y,z)} u(x', y', z') = \min_{z_{min}(z) \le z' \le z_{max}(z)} u_{min}(x, y \mid z') \quad (A.6)$$

where $R(x, y, z) = [x_{min}(x), x_{max}(x)] \times [y_{min}(y), y_{max}(y)] \times [z_{min}(z), z_{max}(z)]$ and $$x_{min}(x) = \max(x - w_x, 0),\ x_{max}(x) = \min(x + w_x, n_x - 1) \quad (A.7)$$
$$y_{min}(y) = \max(y - w_y, 0),\ y_{max}(y) = \min(y + w_y, n_y - 1)$$
$$z_{min}(z) = \max(z - w_z, 0),\ z_{max}(z) = \min(z + w_z, n_z - 1)$$

$u_{min}$(x,y,z) can be computed as follows:

$$\text{for } z = 0 \ldots n_z - 1$$
$$\{u_{min}(x, y \mid z)\} = fastMinFilter2D(\{u(x, y \mid z)\}, w_x, w_y)$$
$$\forall\, x, y$$
$$\{u_0(z)\}_{z=0}^{n_z-1} = \{u_{min}(x, y \mid z)\}_{z=0}^{n_z-1}$$
$$\{u_{0,min}(z)\}_{z=0}^{n_z-1} = fastMinFilter1D\left(\{u_0(z)\}_{z=0}^{n_z-1}, w_z\right)$$
$$\{u_{min}(x, y, z)\}_{z=0}^{n_z-1} = \{u_{0,min}(z)\}_{z=0}^{n_z-1}$$

where fastMinFilter2D is the 2D min filter.

A max filtered array $u_{max}$ ($\underline{x}$) can be derived by applying a min filter to $-u(\underline{x})$ and negating the result, where $\underline{x}$=x in 1D, (x,y) in 2D, and (x,y,z) in 3D:

$$u_{max}(\underline{x}) = -\min_{\underline{x} \in R(\underline{x})} [-u(\underline{x})] \quad (A.8)$$

-continued $$R(\underline{x}) = \begin{cases} [x_{min}(x), x_{max}(x)] & \text{in } 1D \\ [x_{min}(x), x_{max}(x)] \times [y_{min}(y), y_{max}(y)] & \text{in } 2D \\ [x_{min}(x), x_{max}(x)] \times [y_{min}(y), y_{max}(y)] \times [z_{min}(z), z_{max}(z)] & \text{in } 3D \end{cases} \quad (A.9)$$

To identify a peak and to select a peak among multiple peaks, assume that $\underline{x}$ is the location of a peak in $u(\underline{x})$ if and only if $$u(\underline{x}) = u_{max}^{(\underline{x})} \quad (A.10)$$

The system employs a peak filtering by applying a max filter to $u(\underline{x})$. When applied to $u(\underline{x})$, the output of the peak filter is the set of all peak locations (i.e., the set of all $\underline{x}$ that satisfy Equation A.10). The system may eliminate all peaks with values $u(\underline{x})$ less than some minimum value $u_{peak,min}$.

Within a given window, if more than one element satisfies Equation A.10, there are multiple peaks, and the peak location is ambiguous. Peak disambiguation is the process of selecting exactly one peak within every window and reporting its location as the peak location. The following assertion applies to peak filters in any number of dimensions:

If the elements of $u(\underline{x})$ all have different values, then there will be no peak ambiguity (i.e., every window will contain exactly one peak and the location of that peak will be unambiguous) and peak filtering will have guaranteed linear time complexity in the number of array elements The first part of the assertion suggests a method for peak disambiguation. The second part of the assertion can be proven by recognizing that peak filtering is based fundamentally on the 1D min filter. If the elements of a sequence all have different values, for moving windows of any fixed length in the sequence, the number of occurrences of the minimum within a window averaged over all windows will be exactly n=1. In this case, the 1D min filter will have linear time complexity in the number of sequence samples. Thus, the min filter in any number of dimensions and the associated peak filter will have linear time complexity in the number of array elements.

A method for peak disambiguation may rely on transforming the input array into an array in which the elements all have different values (array disambiguation). Any array can be expressed as a sequence of element values $$\{u(x)\}_{x=0}^{m-1}$$

where u(x) is inherently quantized for storage in computer memory. For integer-valued (fixed-point) data, the minimum possible value Δ of the magnitude of the difference between any two elements u(x) that are not equal is unity. For real-valued (floating point) data, b bits are allocated to the fractional part (typically, b=23 for single precision and b=52 for double precision), or else the fractional part can be quantized to b bits, where b is a prescribed number of bits. Thus, the minimum possible value Δ can be represented by the following equation:

$$\Delta = \begin{cases} 2^{-b} & \text{floating point data} \\ 1 & \text{integer data} \end{cases} \quad (A.11)$$

One unit of incremental adjustment to be made to the value of any element u(x) may be represented by the following equation:

$$\varepsilon = \Delta/(2m) \quad (A.12)$$

If so, the array disambiguation formula represented by the following equation:

$$u(x) \leftarrow u(x) + x\varepsilon \quad (A.13)$$

will produce (with linear time complexity) a sequence with no redundant element values in which the rank order of element values in the original u(x) sequence is preserved.

The following example illustrates the process of identifying local peaks in 1D. The following table includes rows for raw sensor readings (SR), disambiguated sensor readings (DSR), max filtered sensor readings (MFSR), and peak filtered sensor readings (PFSR). The table includes a column for each sensor reading.

| Col. # | 0 | 1 | 2 | 3 | 4 | 5 | 6 | 7 |
|---|---|---|---|---|---|---|---|---|
| SR | 1 | 7 | 10 | 10 | 4 | 2 | 8 | 3 |
| DSR | 1.0 | 7.1 | 10.2 | 10.3 | 4.4 | 2.5 | 8.6 | 3.7 |
| MFSR | 10.2 | 10.3 | 10.3 | 10.3 | 10.3 | 10.3 | 8.6 | 8.6 |
| PFSR | X | X | X | 10 | X | X | 8 | X |

The SR row contains the input sensor readings, which in this example are integers. Assuming a sliding window size of three sensor readings, the windows that include both readings of 10, that is windows (7, 10, 10) and (10, 10, 4), will have two peaks, each of which needs to be disambiguated.

The system employs a peak disambiguation technique to select one of the 10s as a local peak. The peak disambiguation technique adds an adjustment to each sensor reading so that each adjusted sensor reading is unique. In this example, the system adds a multiple of a unit of adjustment of 0.1 to each sensor reading. The adjustment for a sensor reading is its column number times the unit of adjustment. For example, the adjustment for column 2 is 0.2 (0.1×2) and for column 3 is 0.3 (0.1×3), resulting in disambiguated sensor readings having a value of 10 as values 10.2 and 10.3. The adjustments are intended to be used only for disambiguation, and the actual sensor readings would typically be used for growing an anomalous object. The DSR row contains the disambiguated sensor readings. No two disambiguated sensor readings have the same value, for example, the 10s are represented as 10.2 and 10.3. In addition, the rank ordering of the sensor readings is preserved. The ascending rank ordering of the SR and DSR rows are both expressed by the same sequence of column indices (0,5,7,4,1,6,2,3).

The MFSR row includes the maximum sensor reading of the windows that cover that sensor reading. For example, the windows covering columns (0, 1, 2) and (1, 2, 3) that both include column 1 have 10.3 as their maximum value, represented by an MSFR value of 10.3 in column 1. As another example, the windows covering columns (4, 5, 6) and (5, 6, 7) that both include column 6 have 8.6 as their maximum value, represented by an MSFR value of 8.6 in column 6.

The PFSR row identifies the local peaks. Local peaks occur when the values of the DSR and MFSR values are the same in a column. Since column 3 has the same DSR and MFSR values, it represents a local peak. Similarly, column 6 represents a local peak with a value PFSR value of 8. The PFSR row represents the peak values in the sensor readings of 10 and 8 in columns 3 and 7.

Although described primarily in the context of identifying local peaks (local maxima), the system may also be used to identify local valleys (local minima). The term extremum refers to either a maximum or a minimum. A minimum filter may be employed to find a minimum value of the elements using the values or a maximum value of the elements using the negative of the values. Similarly, a maximum filter may be employed to find a maximum value of elements using the values or a minimum value of the elements using a negative of the values.

The following paragraphs describe various embodiments of aspects of the system. An implementation of the system may employ any combination of the embodiments. The processing described below may be performed by a computing device with a processor that executes computer-executable instructions stored on a computer-readable storage medium that implements the system.

In some embodiments, a method performed by one or more computing systems is provided for background suppression in a sensor data field having elements. Each element has a position within the sensor data field. For each of a plurality of elements and for each of a plurality of nearby neighborhoods near that element, the method computes a statistic for that neighborhood based on the elements in that neighborhood computes an attenuation coefficient for that element based on the statistic for each neighborhood. The attenuation coefficient represents an amount of background suppression for that element. In some embodiments, one or more dimensions of the sensor data field correspond to different dimensions of space or time. In some embodiments, multiple statistics are computed for each neighborhood wherein the statistics include mean and standard deviation. In some embodiments, for each of the elements and for each of the neighborhoods of that element, the attenuation coefficient is computed based on a function of a prescribed number of standard deviations from that element to the mean for that neighborhood. In some embodiments, the function is a unit ramp function that, for the prescribed number of standard deviations, has a function value of zero for elements at or below one standard deviation below the prescribed number of standard deviations below the mean for a neighborhood, and a function value of unity for elements at or above the prescribed number of standard deviations above the mean for the neighborhood. In some embodiments, the elements are sensor readings and are processed, as a sensor collects the sensor readings, within a collection time window with an ending time that is prior to the current collection time, and with a beginning time that is prior to the ending time. In some embodiments, successive collection time windows are adjacent and non-overlapping in time. In some embodiments, at least some of the attenuation coefficients are based on elements collected prior to the beginning time of the collection time window, and some of the attenuation coefficients are based partially on elements collected after the ending time of the collection time window. In some embodiments, the attenuation coefficient for an element is based on a minimum of attenuation coefficients associated with neighborhoods of that element. In some embodiments, the plurality of nearby neighborhoods of an element include neighborhoods in all directions from that element.

In some embodiments, a method performed by one or more computing systems is provided to detect anomalous objects in a sensor data field of elements. Each element has a position within the sensor data field. The method generates a background-suppressed sensor data field with background-suppressed elements by suppressing elements that represent background using a background suppression level that is established by training classifiers based on a different background suppression level for each classifier and selecting the background suppression level based on effectiveness of the classifiers. For each of a plurality of windows within the background-suppressed sensor data field that are centered on a different background-suppressed element, the method determines whether the window includes a peak element at a peak location that satisfies a peak criterion. For each peak element, the method grows an anomalous object from the peak location of that peak element to include elements whose positions are adjacent to each other in the field and that satisfy an object criterion, extracts a feature vector of features for the grown anomalous object, and classifies the feature vector as representing an anomalous object of interest or an anomalous object not of interest. The classifier is associated with the selected background suppression level. In some embodiments, an element is background suppressed by multiplying by an attenuation coefficient derived from a candidate attenuation coefficient associated with neighborhoods of elements surrounding the element. In some embodiments, the method further for each of a plurality of different background suppression levels the performs the following. For each of a plurality of sensor data fields used for training, the method performs background suppression of the elements in that sensor data field based on that background suppression level and extracts peaks in the background-suppressed sensor data field. The method grows anomalous objects in that sensor data field from peaks in the background-suppressed sensor data field. The method extracts a feature vector for each grown anomalous object. Finally, the method assigns a class label of interest or not of interest to each grown anomalous object based on prior knowledge of objects of interest within that sensor data field. The method then, for the background suppression level, trains an object classifier using feature vectors and the class labels.

In some embodiments, a method performed by one or more computing systems is provided for generating a classifier to classify anomalous objects extracted from a sensor data field as of interest or not of interest. The method, for each of a plurality of different background suppression levels, trains an object classifier using training data extracted from background-suppressed sensor data fields based on that background suppression level. The training data includes feature vectors for anomalous objects labeled as of interest or not of interest based on prior knowledge of positions of objects of interest in the sensor data fields. The method then selects one of the object classifiers associated with a background suppression level based on effectiveness of classification. In some embodiments, the method, for each background suppression level and for each sensor data field that suppression level identifies peak elements in the background-suppressed sensor data field that satisfy a peak criterion. For each peak element within the background-suppressed sensor data field, grows an anomalous object in the sensor data field from the peak element to include elements that are connected to each other in the sensor data field and satisfy an anomalous object criterion, extracts a feature vector representing features of the grown anomalous object, and labels the feature vector as being of interest or not of interest based on prior knowledge of the positions of objects that are of interest in the sensor data field. In some embodiments, the method further, for the classifier trained on sensor field data at each background suppression level, generates an effectiveness score based on the number of correct and incorrect object classifications made by that classifier. In some embodiments, the classifier output is a real number that is a rating as to whether the input object is of interest.

In some embodiments, one or more computing systems are provided for processing sensor data fields of elements. Each element has a position within the sensor data field. The one or more computing systems include one or more computer-readable storage mediums that store computer-executable instructions for controlling the one or more computing systems and one or more processors for executing the computer-executable instructions stored in the one or more computer-readable storage mediums.

For each of a plurality of elements and for each of a plurality of neighborhoods surrounding that element, the method calculates a neighborhood significance level for that neighborhood based on elements within that neighborhood and establishes an attenuation coefficient for that element based on the neighborhood significance levels. In some embodiments, the neighborhood significance level for each neighborhood is based on the mean and standard deviation of elements within that neighborhood. In some embodiments, the neighborhood significance level for a neighborhood is based on a function of the mean and standard deviation of elements within that neighborhood. In some embodiments, the function is a ramp function. In some embodiments, the elements are processed during collection of the elements within a time window of elements, the time window with an ending window collection time that is before a current collection time, and a beginning window collection time that is before an ending window collection time. In some embodiments, the attenuation coefficients for at least some of the elements are set based on elements collected before the beginning window collection time, and the attenuation coefficients for at least some of the elements are set based on elements collected after the ending window collection time. In some embodiments, attenuation coefficient associated with an element is set based on a minimum of the neighborhood significance levels for the neighborhoods of that element.

In some embodiments, a method performed by one or more computing systems is provided for identifying a local extremum within an array of elements having values, the values having a rank ordering. The method generates a disambiguated value for each element so that each element has a disambiguated value that is unique among the disambiguated values and so that the rank ordering of the disambiguated values is consistent with the rank ordering of the values. For each of a plurality of elements, the method sets an extremum value for that element to an extremum value of the disambiguated values in a plurality of sliding windows that cover that element. The method designates as a local extremum each element with a disambiguated value that is the same as the extremum value for that element. In some embodiments, the generating of the disambiguated values includes adding a different multiple of a unit of an adjustment to each value. In some embodiments, the extremum value is a maximum value. In some embodiments, the extremum value is a minimum value.

In some embodiments, a method performed by one or more computing systems is provided for identifying extremums within a multi-dimensional array of elements having original values. The method initializes initializing an array of elements having filter values to the original values. For each of the plurality of dimensions in sequence from a first dimension to a last dimension, the method selects the dimension and updates the filtered values by applying a one-dimensional extremum filter to each set of values that have different index values in the selected dimension but the same index value in the other dimensions. The last updated filtered values represent the extremums.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method performed by one or more computing systems to detect anomalous objects in a sensor data field of elements, each element having a position within the sensor data field, the method comprising:

generating a background-suppressed sensor data field with background-suppressed elements by suppressing elements that represent background using a background suppression level that is established by training classifiers based on a different background suppression level for each classifier and selecting the background suppression level based on effectiveness of the classifiers;

for each of a plurality of windows within the background-suppressed sensor data field that are centered on a different background-suppressed element, determining whether the window includes a peak element at a peak location that satisfies a peak criterion, wherein the peak criterion comprises the peak element being a local maximum of background-suppressed sensor readings within the window relative to neighboring background-suppressed sensor readings within the window; and for each peak element, growing an anomalous object from the peak location of that peak element to include elements whose positions are adjacent to each other in the field and that satisfy an object criterion;

extracting a feature vector of features for the grown anomalous object including at least: positions of objects of interest, depth of object, mean of observed sensor values for sensor readings associated with the object, and object symmetry in the sensor data fields; and classifying the feature vector as representing an anomalous object of interest or an anomalous object not of interest, the classifier being the classifier associated with the selected background suppression level.

2. The method of claim 1 wherein an element is background suppressed by multiplying by an attenuation coefficient derived from a candidate attenuation coefficient associated with neighborhoods of elements surrounding the element.

3. The method of claim 1 further comprising for each of a plurality of different background suppression levels:

for each of a plurality of sensor data fields used for training, performing background suppression of the elements in that sensor data field based on that background suppression level;

extracting peaks in the background-suppressed sensor data field; and growing anomalous objects in that sensor data field from peaks in the background-suppressed sensor data field;

extracting a feature vector for each grown anomalous object; and assigning a class label of interest or not of interest to each grown anomalous object based on prior knowledge of objects of interest within that sensor data field; and training an object classifier using feature vectors and the class labels.

4. A method performed by one or more computing systems for generating a classifier to classify anomalous objects extracted from a sensor data field as of interest or not of interest, the method comprising:

for each of a plurality of different background suppression levels, training an object classifier using training data extracted from background-suppressed sensor data fields based on that background suppression level, the training data including feature vectors for anomalous objects labeled as of interest or not of interest based on prior knowledge of features including at least: positions of objects of interest, depth of object, mean of observed sensor values for sensor readings associated with the object, and object symmetry in the sensor data fields; and selecting one of the object classifiers associated with a background suppression level based on effectiveness of classification, wherein the effectiveness of classification is determined by evaluating the object classifier on labeled anomalous objects and computing numbers of correct and incorrect classifications relative to the labels.

5. The method of claim 4 further comprising for each background suppression level:

for each sensor data field, identifying peak elements in the background-suppressed sensor data field that satisfy a peak criterion; and for each peak element within the background-suppressed sensor data field, growing an anomalous object in the sensor data field from the peak element to include elements that are connected to each other in the sensor data field and satisfy an anomalous object criterion;

extracting a feature vector representing features of the grown anomalous object; and labeling the feature vector as being of interest or not of interest based on prior knowledge of the positions of objects that are of interest in the sensor data field.

6. The method of claim 4 further comprising for the classifier trained on sensor field data at each background suppression level, generating an effectiveness score based on the number of correct and incorrect object classifications made by that classifier.

7. The method of claim 6 wherein the classifier output is a real number that is a rating as to whether the input object is of interest.

* * * * *